Oct. 19, 1965     T. J. BRADFORD     3,212,350
CUSHIONED ACTION VALVE LINKAGE
Filed Feb. 26, 1962
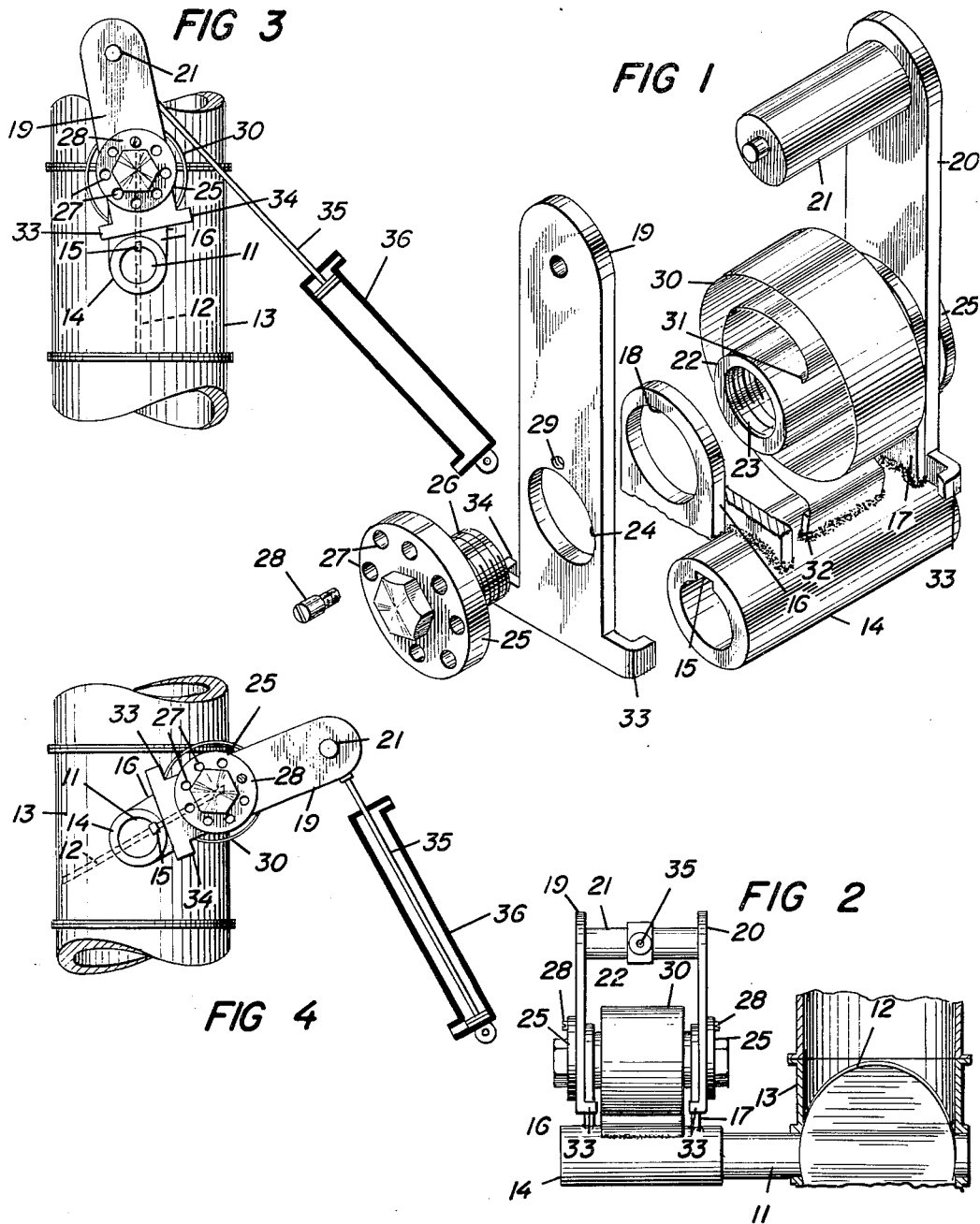
INVENTOR
Thomas J Bradford
by *[signature]*
his Attorney

United States Patent Office 3,212,350
Patented Oct. 19, 1965

3,212,350
CUSHIONED ACTION VALVE LINKAGE
Thomas Jefferson Bradford, Borger, Tex., assignor, by mesne assignments, to Ashland Oil & Refining Company, Ashland, Ky., a corporation of Kentucky
Filed Feb. 26, 1962, Ser. No. 175,620
3 Claims. (Cl. 74—470)

This invention relates to valve linkages and more particularly to a cushioned action valve operating linkage. The invention will find utilization in connection with automatically operated valves in which a valve closure member is repeatedly brought to bear against a valve seat by a motor having a driving member connected to the closure member through valve linkage.

The invention was conceived as a solution to a problem experienced with motor operated butterfly valves, and will therefore be described in connection therewith. However, it will be apparent to those skilled in the art that the invention is useful with other types of valves as well.

A butterfly valve usually consists of a generally cylindrical body portion open at both ends, a transverse shaft journaled in bearing surfaces in or on the valve body walls, and a generally elliptical closure member which is mounted upon the shaft. The minor axis of the elliptical closure member is approximately equal to the diameter of the valve body and is secured to a flattened portion of the shaft. In a butterfly valve the inner wall of the valve body constitutes the valve seat, and the elliptical closure member is known as a "flapper."

The major axis of the elliptical flapper is usually slightly longer than the diameter of the valve body. When the valve is closed the periphery of the flappper seats against the interior wall of the valve body; the flapper then lies in a plane which forms an acute angle with the longitudinal axis of the valve body.

The flapper is usually fabricated from a thin sheet of metal which has been champhered about its periphery to provide a close fit with the internal wall of the valve body when the valve is closed. Because of the relative thinness of the flapper and the closeness of the aforementioned acute angle to 90°, the operation of seating the flapper results in the application of a considerable amount of force to the champhered edge of the flapper, especially when there is a large mechanical advantage in the valve operating linkage.

In automatically controlled manufacturing processes, motor operated butterfly valves are frequently used to control the flow of materials from one location to another. By the term "motor" we refer to any device for converting stored energy to active energy or moving force. Examples include solenoids, pneumatic air cylinders, electric motors with gear trains, and the like. Where the motor mechanism is fast acting and the moving parts have appreciable mass, the residual momentum of said moving parts will exert a sharply applied terminal force to the flapper when it seats. As a result the flapper is seated with a hammering force.

Experience has shown that repetitive operation under these conditions rapidly wears the flapper and its seat, resulting in early failure, loss of valve efficiency, and the necessity of frequent repairs. These valves are often used in a key part of a complex system and/or in an inaccessible location, thus making valve failures an expensive loss, due to the large amount of labor time which must be expended in the replacement of them and to the production losses which occur while the valves are being serviced.

The objects of this invention are:
(1) To provide for the transmission of operating force from a motor to a valve through linkage which will absorb the first impact of the valve closure member against its seat.
(2) To provide specially constructed operating linkage for eliminating wear in butterfly valves arising out of the hammering force exerted on the flapper in such valves by mechanical closers,
(3) To provide a simple, easy to construct, and inexpensive device for extending the life of valves,
(4) To provide motor-operated butterfly valves with operating linkage which linkage cushions the initial contact of the valve flapper with the valve body and then firmly seats the flapper, and
(5) To provide valve operating linkage having adjustable means for regulating the force exerted upon the valve seat by the valve closure member when it is in closed position.

The above objects are fulfilled by a device which may be broadly characterized as follows:

Cushioned action valve linkage for rotary shaft operated valves, comprising: securing means adapted to be secured on the shaft of such a valve; a pair of spaced arms fastened to said securing means and extending radially outward therefrom; shaft means associated with the outer ends of said arms; a pair of levers associated with said shaft means, said levers being adapted for clockwise and counterclockwise pivotal movement with respect to said arms in planes lying generally parallel thereto, said levers being further adapted to connect to motor means; stop means associated with said arms and levers for restricting the scope of the pivotal movement thereof; and spring biasing means operatively associated with said arms and levers.

The invention is also concerned with devices of the above described type wherein the levers are fixed on the aforesaid shaft means, and devices wherein means are provided for locking the levers and shaft means against rotation with respect to one another at any one of a plurality of points of rotational adjustment.

A preferred embodiment of the invention will hereinafter be described. Those skilled in the art will readily appreciate that changes can be made in the number, form, material and position of certain parts found in this specific embodiment. Therefore, this example of how to construct an embodiment of my invention and the various details which must necessarily be given in order to make a complete description thereof, should be regarded as illustrative only and should not be construed as unduly limiting the appended claims.

Referring now to the drawings, FIGURE 1 is an exploded perspective view of the cushioned-action valve linkage, constructed in accordance with the invention.

FIGURE 2 is a front elevation of the linkage connected to the valve, which is shown partly in fragment, partly in section.

FIGURE 3 is a side elevation showing the valve and linkage in "open" position.

FIGURE 4 is a side elevation showing the valve and linkage in "closed" position.

In FIGURES 1 and 2 the valve operator is a shaft 11 to which is secured the flapper 12. The shaft and flapper assembly are journaled in suitable bearings (not shown) provided in the sides of the valve body 13. As is common in such valves, an extended portion of shaft 11 protrudes from the side of the valve body 13. To this extended portion is attached the means for securing the arm members of the linkage against rotary movement relative to a shaft lever. In this embodiment the securing means comprises a collar 14 having an internal diameter selected to insure a snug fit between said collar and shaft 11. Additional securing means in the form of a keyway 15 and key means (not shown) may also be employed to insure positive locking. Arms 16 and 17 are welded or fastened by other suitable means to the collar 14 so that they are disposed radially outward therefrom. Because of the positive connection between said arms and said collar, and because of the locking of said collar 14 onto the shaft 11, said arm members are operatively associated with the valve shaft 11 and with the flapper 12.

The arm members 16 and 17 are provided with a pivot which in this case comprises a tubular shaft 22. Shaft 22 passes through a slightly oversized hole 18 in the upper end of arm 16. It also passes through a similar hole (not shown), which is at a corresponding location in arm 17. The length of the shaft 22 is such that it protrudes a short distance beyond the outer surfaces of the arms 16 and 17. This protruding portion provides a mounting for the levers 19 and 20. The lever 19 engages shaft 22 by means of a large hole 24 in the lower portion of lever 19 corresponding to the hole 18 in the upper end of arm 16. A hole similar to the hole 24 is provided in lever 20. The levers 19 and 20 are retained on the shaft 22 with the aid of two discs 25 having threaded portions 26 which are screwed into internal threads 23 provided in each end of tubular shaft 22.

At least one and preferably both of the discs 25 are provided with means to lock the discs against rotation with respect to said levers. Those skilled in the art will be aware of many devices which will accomplish this task. However, the inventor prefers to provide each disc 25 with a plurality of holes 27, spaced apart from one another in a circle of somewhat smaller diameter than said disc and concentric therewith. One of said holes 27 is brought into registry with a threaded hole in one of the levers, such as hole 29 in lever 19, and a set screw 28 is inserted therein. In this manner the levers 19 and 20 are secured to the shaft 22 and are pivotally mounted on the arms 16 and 17 so that said levers are capable of rotary movement in a first plane which is generally parallel to the plane in which said arms move. It should be observed that the pivoting of the levers 19 and 20 will cause the shaft 22 to turn in the holes provided in the arms 16 and 17 (such as hole 18 in arm 16).

At least one of the levers and/or arms must be provided with stop means for restricting the rotation of said levers with respect to said arms to an angle of rotation which is smaller than the normal over-all angle of displacement traversed by the valve operator between the valve's fully open and closed positions. In this embodiment the stop means are provided in the following manner. On the levers 19 and 20 radially inward from shaft 22 with respect to the valve shaft 11 are located clockwise stops 33 and counter-clockwise stops 34 defining clockwise and counter-clockwise limits. The spread between said limits is such that the rotation of the levers 19 and 20 is restricted to a total angular displacement which is small when compared to the over-all angle of displacement traversed by the flapper and valve shaft assembly between the flapper's fully open and closed positions.

At the opposite ends of said levers is a second securing means which in this embodiment takes the form of a wristpin 21. To the wristpin 21 is secured the plungers 35 of any suitable motor means, such as the pneumatic cylinder 36.

The cushioning action is provided with the aid of spring means, such as the coil spring 30. The spring 30 is fastened into the device in such a manner that if it were compressed by coiling it would tend to uncoil by rotating in a direction opposite to that direction in which the linkage must be turned to close the valves. A lug 32 is provided on the collar 14 for securing the outer end of the coil spring 30. The inner end of said spring is received in slot 31 provided in tubular shaft 22. The spring 30 may be placed under tension by rotating the discs 25 (with the set screws 28 removed) in the proper direction until the desired tension is obtained. Then, in order to maintain the tension at the desired level, said screws 28 may be re-inserted in those holes 27 which most closely coincide with the small set screw holes 28. In this manner the spring means becomes operatively associated with said arms and levers for biasing said arms against the stop means in opposition to the direction of rotation in which said levers tend to move about said pivot when closing the valve. When the coils of said spring 30 unwind in a counter-clockwise direction as shown in this embodiment, the counter-clockwise stops 34 will be in contact with the arms 16 and 17 when no force is being exerted on the linkage, such as when the valve is in its normal position.

The operation of the device is as follows: When the motor is energized the plunger 35 will retract, causing the radially outward end of the levers 19 and 20 to rotate clockwise about the valve shaft 11, causing it to turn in the same direction. As a result the flapper 12 will be moved in the same direction of rotation, toward contact with the interior walls of the valve body 13. During this stage of operation the valve linkage will remain in the normal position referred to above, that is, the arms 16 and 17 will be maintained in contact with the counter-clockwise stops 34 under the influence of spring 30. therefore, the linkage will be spring loaded in the direction in which the linkage is turning to close the valve. Assuming that closing proceeds normally this condition will be maintained at least until the flapper makes its initial contact with the interior of valve body 13. When such contact is made, the movement of the flapper will essentially cease, since very little movement can take place between the time when the flapper makes its initial contact with the valve and the time when the flapper is fiully seated. In a butterfly valve which is properly adjusted and free from wear, the amount of movement during such period approaches zero.

These steps in the operation of the device are significant for the following reasons. When the flapper seats, the motor will still have an appreciable amount of momentum which it would ordinarily transmit through the plunger and value linkage to the valve body through the flapper. When the flapper is called upon to absorb this residual momentum repeatedly the effect is deterioration of the flapper and its seat. However, in the present invention, the levers 19 and 20 are spring loaded in the direction in which the valve is closed. Therefore as the flapper seats, the residual momentum of the motor is absorbed by the spring 30 as the levers 19 and 20 rotate about the ends of the arms 16 and 17, compressing the spring still further and drawing the stops 34 away from the arms 16 and 17, as shown in FIGURE 4.

It will be apparent that if the throw of the plunger 35 is not limited in some manner, it could, if powerful enough, compress the spring far enough to bring the clockwise stops 33 into contact with the arms 16 and 17. The result will be in effect a positive engagement of the flapper with the motor 36, causing the same deleterious results that this invention is designed to avoid. Therefore, the throw of the plunger 35 should be regulated in such a manner that the plunger may extend only far enough to bring the flapper home without also causing the clockwise stops 33 to contact the arms 16 and 17.

While it appears possible to dispense with the clockwise stops if the throw of plunger 35 were carefully regulated, both clockwise and counter-clockwise stops are illustrated in this preferred embodiment because of certain advantages which accure from having both. The above description of operation assumes that the flapper and the valve shaft assembly were able to turn freely between the open and closed positions, however, this is not always the case.

For instance, in the flues of carbon black reactors where large quantities of carbon, tarry materials and corrosive gases are present, it is often the case that the valves will become "sticky" in operation. This is especially true when the valves are operated infrequently. If the operation of the valve is sufficiently "sticky," the resultant retarding forces may be sufficient to exceed the compressive force of the spring 20 prior to the time when the flapper seats against the interior of the valve body. As a result, the linkage would be unable to seat the valve. However, if stops are provided in both directions, the levers 19 and 20 will turn on the shaft 22 about the ends of arms 16 and 17 against the action of the spring 20 until the clockwise stops 33 come in contact with the arms 16 and 17. Then the linkage will be rigid in the direction in which the valve is being closed until the obstruction is passed or until the plunger 35 reaches its limit of travel just prior to the seating of the flapper 12.

Therefore, it is a feature of my invention that the valve linkage is normally rigid in one direction to provide a positive opening force and spring loaded in the opposite direction to provide a cushion seating of the valve when it is being closed. Moreover, if the operation of the valve should be sticky, the linkage will become fully rigid until the obstruction to the turning of the valve is passed or until the flapper is almost seated.

The closing movements of the linkage are relatively simple. When the valve has closed normally, the levers 19 and 20 will have rotated about the shaft 22 to the extend necessary to disassociate the counter-clockwise stops 34 from the arms 16 and 17. The arms, levers and stops will remain in this relationship as long as the valve is closed. However, when the motor is energized and the plunger begins to extend, the levers 19 and 20 will rotate about the shaft 22 until the arms 16 and 17 are again in contact with the counter-clockwise stops. As the plunger continues to extend, the linkage then rotates counter-clockwise as a rigid assembly until the plunger is fully extended and the valve is completely opened.

In the above description of a preferred embodiment and its operation it is assumed that the butterfly valve was one on which the operator (shaft 11) had to be rotated clockwise from the open position in order to seat the flapper and close the valve. In the event that this invention is applied to a valve having an operator which must be turned counter-clockwise in order to close the valve the spring 30 would need to be coiled in the opposite direction and in the operation of the device the roles of the clockwise and counter-clockwise stops would be reversed, so far as the above description is concerned. In actual practice, however, it would be necessary only to turn the entire linkage apparatus around so that the lever 20 was closest to the valve body rather than lever 19.

Those skilled in the mechanical arts are familiar with many types of valves having various types of operators. They are also aware of various types of securing means, pivots, stops means and spring means. It should be understood that the above terms are utilized in the appendant claims with an intention to include within the scope thereof all equivalents not foreclosed by the prior art.

Having fully described the invention and the specific embodiment thereof I claim:

1. Cushioned action valve linkage for rotary shaft operated valves, comprising: securing means adapted to be secured on the shaft of such a valve; a pair of arms fastened to said securing means and extending radially outward therefrom; shaft means pivotally mounted between said arms; a pair of levers fixed on the shaft means for clockwise and counterclockwise pivotal movement with respect to said arms in planes lying generally parallel thereto, said levers being fixed on the shaft means with the aid of locking means for locking the levers and shaft means against rotation with respect to one another at any one of a plurality of points of rotational adjustment, said levers being further connected to motor means; stop means provided on said levers which cooperates with said arms for restricting the scope of the pivotal movement of said levers; and spring means provided on said shaft means for biasing said stop means against said arms in opposition to the direction of rotation in which said levers move when closing said valve and thereby providing a cushioned action valve linkage.

2. Cushioned action valve linkage for rotary shaft operated valves, comprising: a collar adapted to be secured on the shaft of such a valve; a pair of laterally spaced arms fastened to said collar and extending radially outward therefrom; shaft means pivotally connected to said arms and protruding beyond the outer surfaces of said arms; a pair of levers retained on said shaft means for clockwise and counterclockwise pivotal movement with respect to said arms in planes lying generally parallel thereto, said levers being further connected to motor means; means for locking said levers and said shaft means against rotation with respect to one another at any one of a plurality of points of rotational adjustment; stops means provided on said levers which cooperates with said arms for restricting the scope of the pivotal movement of said levers; and spring means provided on said shaft means for biasing said stop means against said arms in opposition to the direction of rotation in which said levers move when closing said valve and thereby providing a cushioned action valve linkage.

3. Cushioned action valve linkage according to claim 2 wherein said spring means includes a coil spring wound under tension about said shaft means and secured thereto at its inner end, the outer end of said spring being secured to said collar.

References Cited by the Examiner

UNITED STATES PATENTS

| 397,367 | 2/89 | Kaye | 74—599 X |
| 664,578 | 12/00 | Pancoost. | |
| 1,751,172 | 3/30 | Reinhardt | 251—78 X |
| 1,791,819 | 2/31 | Kull et al. | 74—470 X |
| 1,842,707 | 1/32 | Alsaker et al. | 74—519 X |
| 1,881,560 | 10/32 | Heitger | 74—470 X |
| 1,909,161 | 5/33 | Ballard | 74—528 X |
| 2,065,167 | 12/36 | Wirth et al. | 251—78 |
| 2,594,891 | 4/52 | Embree | 74—470 X |
| 2,930,246 | 3/60 | London et al. | 74—470 |
| 3,011,208 | 12/61 | Bomm et al. | |
| 3,060,963 | 10/62 | Jackson et al. | 251—77 X |
| 3,129,725 | 4/64 | Lapsley | 251—80 X |

FOREIGN PATENTS 220,855    8/24    Great Britain.

BROUGHTON G. DURHAM, *Primary Examiner.*